United States Patent [19]

Tonutti

[11] Patent Number: 5,263,306
[45] Date of Patent: Nov. 23, 1993

[54] RAKE TROLLEY WITH ADJUSTABLE WORKING WIDTHS SUITABLE FOR FINGER WHEEL HAY RAKES

[75] Inventor: Carletto Tonutti, Tricesimo, Italy
[73] Assignee: Tonutti S.p.A., Italy
[21] Appl. No.: 924,743
[22] Filed: Aug. 4, 1992

Related U.S. Application Data

[63] Continuation-in-part of Ser. No. 774,712, Oct. 9, 1991.

[30] Foreign Application Priority Data

Jul. 19, 1991 [IT] Italy .................... UD91U000029

[51] Int. Cl.⁵ ............................................ A01D 78/14
[52] U.S. Cl. ..................................... 56/377; 56/15.9; 56/384; 56/DIG. 21
[58] Field of Search ............... 56/15.9, 377, 384, 16.1, 56/16.2, 16.3, 367, 350, 378, 379, 341, DIG. 14, DIG. 21

[56] References Cited

U.S. PATENT DOCUMENTS

| 4,370,846 | 2/1983 | Arnold | 56/16.2 X |
| 4,947,631 | 8/1990 | Kuen | 56/15.5 X |
| 4,974,407 | 12/1990 | Rowe et al. | 56/377 |
| 4,977,734 | 12/1990 | Rowe et al. | 56/15.9 |
| 5,127,216 | 7/1992 | Kelderman | 56/15.9 |

Primary Examiner—Stephen J. Novosad
Attorney, Agent, or Firm—Andrus, Sceales, Starke & Sawall

[57] ABSTRACT

The present invention regards a rake trolley with adjustable working widths, suitable for three point hitch finger wheel hay rakes. The trolley includes a transverse frame member. A pair of rake arms are connected to a pair of movable heads or supports, and a raising and lowering assembly is interconnected between the frame member and each rake head. The raising and lowering assembly includes a linkage, with a connector member on each side of the linkage extending between the linkage and one of the rake heads. A hydraulic cylinder assembly is interconnected with the linkage for moving it between a first position in which the rake arms are pivoted to a lowered, or working position, and a second position in which the rake arms are pivoted to a raised, or transport, position. The connector members are adjustable in length, to accommodate connection of the rake heads to varying positions along the length of the frame member.

5 Claims, 6 Drawing Sheets

RAKE TROLLEY WITH ADJUSTABLE WORKING WIDTHS SUITABLE FOR FINGER WHEEL HAY RAKES

CROSS REFERENCE TO RELATED APPLICATION

This application is a continuation-in-part of application Ser. No. 07/774,712 filed Oct. 9, 1991.

BACKGROUND OF THE INVENTION

The present invention regards a rake trolley with adjustable working widths suitable for three point hitch finger wheel rakes characterized by the fact that the trolley is suitable for the majority of hay rakes having a standard international three point hitch. Two hay rakes can be assembled onto this trolley without further modifications, devices or adapting clamps.

Furthermore, the structure in a working phase can be regulated to different widths without having to modify the optimal angle of inclination of the two rakes, allowing the rake wheels to always have a gentle contact with the forage to be harvested. This aspect of the invention drastically reduces the loss of leaves and thus improves remarkably the nutritive value of the forage. The trolley includes two moveable heads (right hand and left hand) that slide on the main frame towards the inside and outside, which allow an operator to modify the working width of the machine, modifying at the same time, in equal measurement, the formation of the back row without modifying the inclination of the two hay rakes.

The two moveable heads, able to support hay rakes with a standard international three point hitch, are actioned by two hydraulic cylinders that allow the rotation on a pivot of the two hay rakes from a working position (lowered) to a transport position (lifted) thus avoiding waste of time on the operator's behalf who does not have to intervene manually, as happens in other known implements, to modify the positions of the two hay rakes.

The cylinders that rotate the two moveable heads can be used in four different ways 1) Single hydropneumatic effect with single action as per FIG. 1; 2) Single hydropneumatic effect with double action as per FIG. 2; 3) Double effect single action as per FIG. 3; 4) Double effect double action as per FIG. 4

This feature allows the maximum flexibility in the use of the two hay rakes which can be adapted onto all types of tractors, from simple, older tractors with only one hydraulic connector (FIG. 1) or on the more modern tractors with four hydraulic connectors (FIG. 4).

The rake trolley has been designed so as to make it easy to disassemble and to reduce to a minimum its space volume, a very important factor in the cost of transport and in particular for the shipping of containers.

At the present state of technology, fixed rakes exist (assembled on structures and carried on three point hitch on the tractor or on trolleys always attached to the tractor) and other variable parallelogram structures (assembled on wheels) keeping the carrying structure parallel to the ground.

The present invention overcomes the structural complexity of the existing implements with a structure that is simple to carry out and is also of a simple composition.

The rake trolley (which carries from 2 to 6 wheel rakes on each side) has a central drawbar, two rake head supports, one on each side, which are each actioned by an oleodynamic (hydraulic) cylinder on which one places the finger wheel hay rakes.

The rake head supports are orientable in the space there is (registered by hand) and directly actioned with the oleodynamic cylinders with the aid of the tractor.

In a working position, the rake wheels take up a large amount of space on the right hand and left hand side, which can be registered with its proper rods and mechanical clamps, while in a transport position, the geometrical configuration varies from the working position to an oblique lifted position reducing the side space.

One of the main aspects of the present invention is its ability to vary the width of the carriage and consequently the moveable heads which support the hay rakes. This allows for one to adapt the height on the basis of the width of the windrow (whose width has been determined by the mower) improving its performance.

As an option to the invention, one can add to the drawbar, an arm carrying rake wheel that works in the middle of the two side rakes. This is to improve the result of work of the machine in particular for the central part which is not taken care of with the side rakes.

BRIEF DESCRIPTION OF THE DRAWINGS

The rake trolley with adjustable working widths will be better described with the help of the enclosed drawings which carry three embodiments of the invention.

In the drawings:

FIG. 12 is a top view of the third version of the rake trolley, as shown in FIG. 11a.

DETAILED DESCRIPTION OF THE INVENTION

Figure 1:
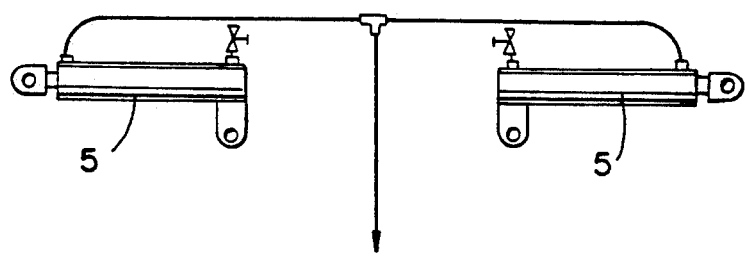
FIGS. 1–4 show various arrangements for actuating the hydraulic cylinders for rotating the moveable heads of the trolleys as summarized above.
Figure 2:
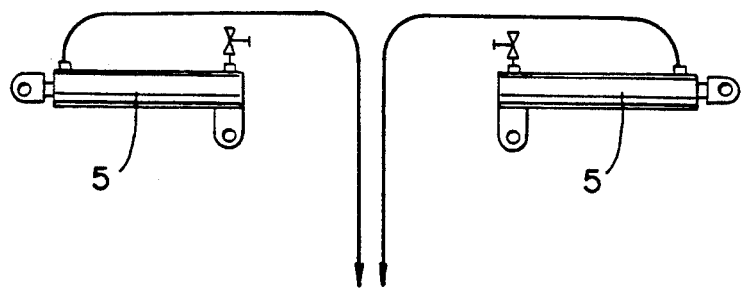
Figure 3:
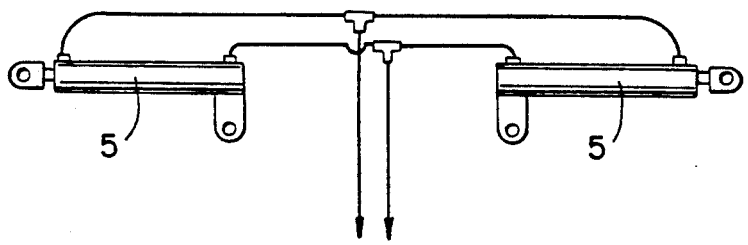
Figure 4:
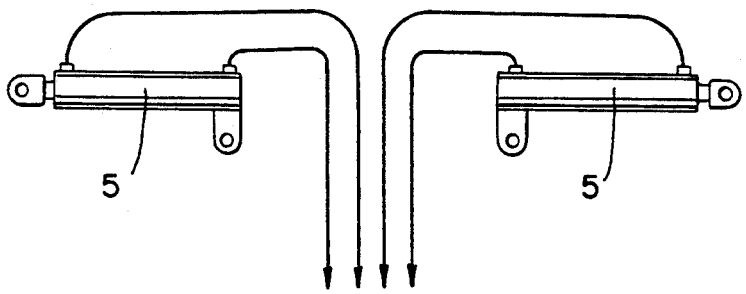
Figure 5:
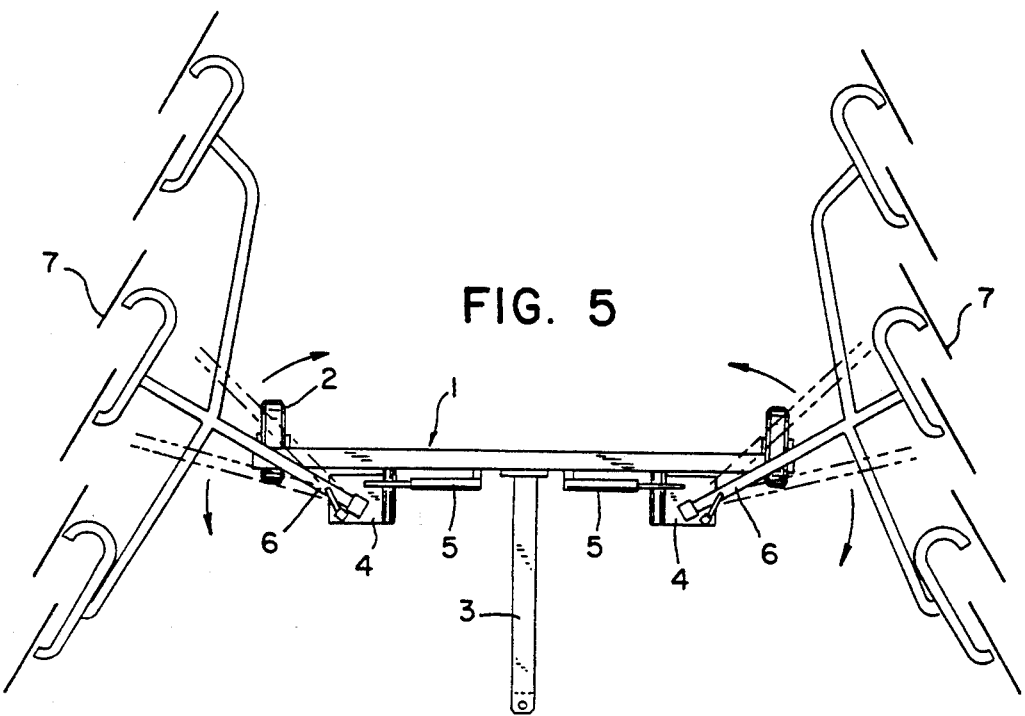
FIGS. 5 and 6 are respectively a top and front view of the trolley with the rake wheels in a lowered position which is the working position.
Figure 6:
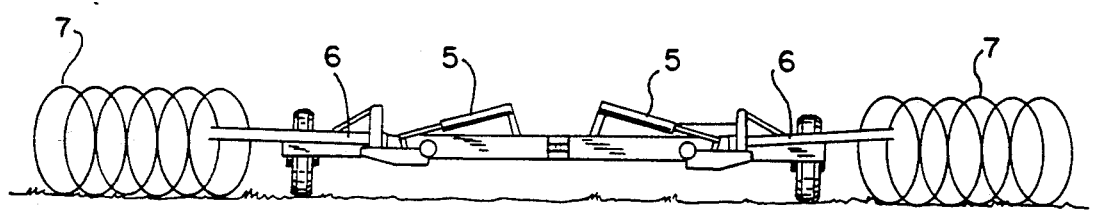
Figure 7:
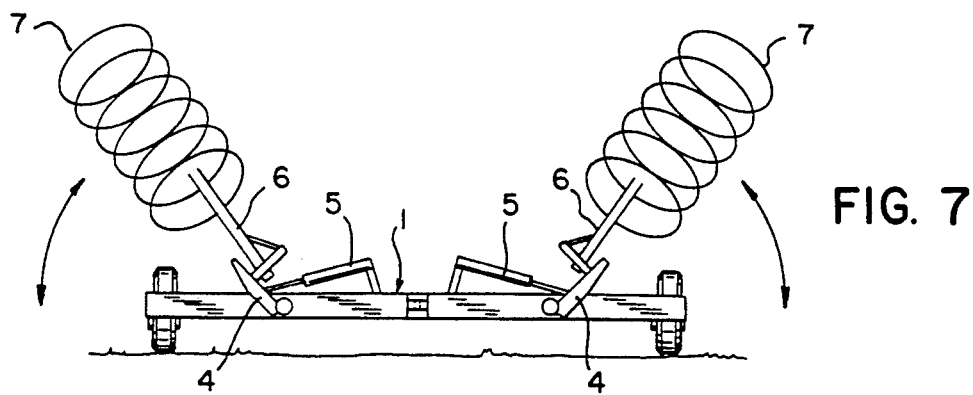
FIG. 7 is a front view of the trolley as per FIG. 6 but with the rake wheels lifted, in a transport position, by actioning the oleodynamic cylinders.

The first version (FIGS. 5–7 shows a trolley with the structure of the side rake wheels (7), which can be completely disassembled. The frame (1) consists of a bar with two pneumatic tires one on each side (2), towed by a tractor by means of a drawbar (3). On the bar frame, on the right hand and left hand side are the moveable heads (4) which are actioned one at a time by oleodynamic cylinders (5). On each moveable head there is an arm or frame (6) which carries the rake wheels (7).

Figure 8:
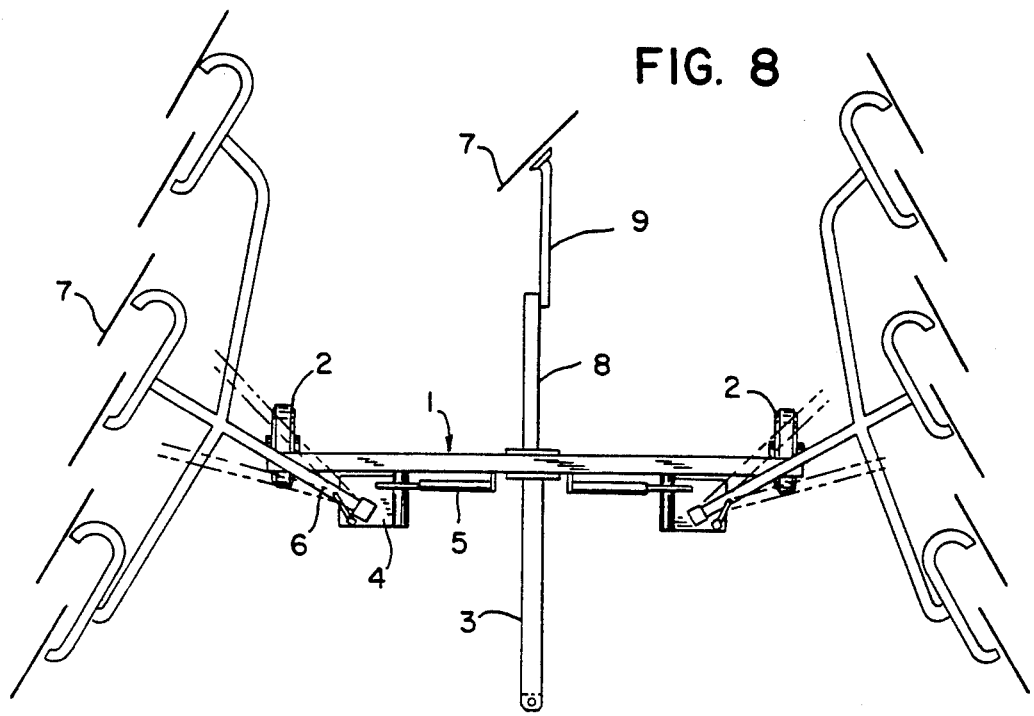
FIGS. 8 and 9 are respectively a top and front view of the trolley in the second version, with the supporting structure for the central wheel.
Figure 9:
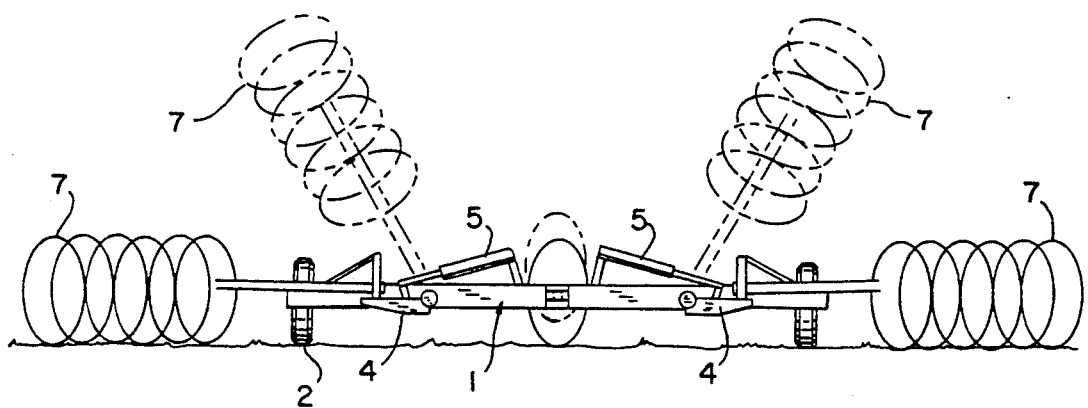
Figure 10:
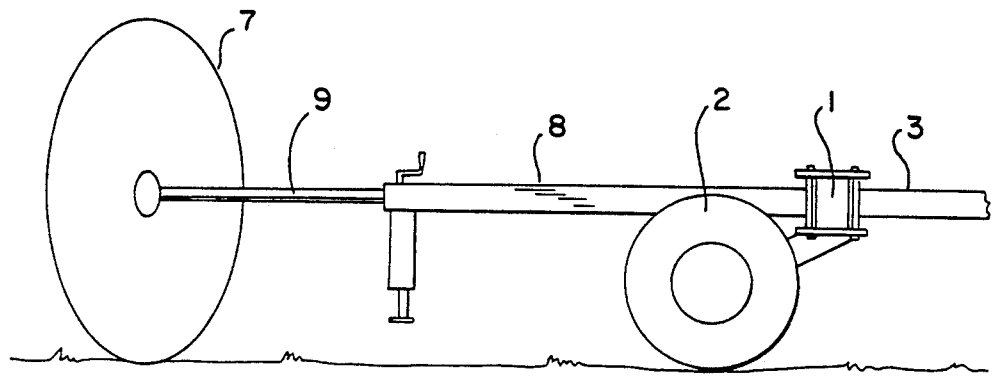
FIG. 10 is a partial side view of the rake emphasizing the central wheel and its supporting arm.

In the second version (FIGS. 8-10), all is as above with a central arm (8) on which an extension (9) has been fitted to carry the rake wheel (7).

In this version, the central wheel moves the hay and grass which has been cut in the center, which would not be touched by the side rake wheels. This central wheel is lifted from the ground in synchrony with the lifting of one of the two side rakes (e.g. with the left hand side with a steel rod or other part suitable to lift).

The moveable heads, other than regulating manually for the right side position, are lifted into an oblique position by oleodynamic cylinders thus reducing the space taken up by the rakes on the sides.

In the third solution (FIGS. 11a, 12), the rake trolley has a tubular frame (1) on which the ground wheel supports have been fixed (11) and also the supports for the moveable heads (4) one right hand and one left hand. These supports can be adjusted for the width along the whole frame, thus regulating the working width of the rake wheels.

Figure 11A:
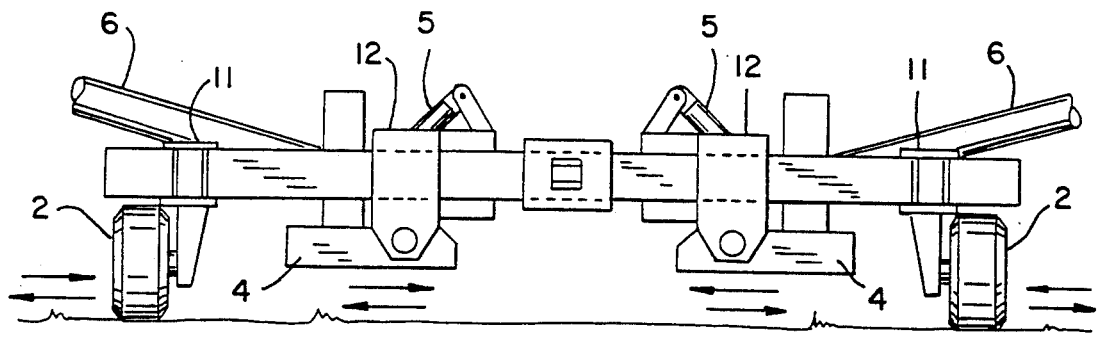
FIG. 11a is a front view of the third version of the rake trolley showing the main characteristics of the main frame that supports the heads which can be adjusted in the width on the whole frame.
Figure 12:
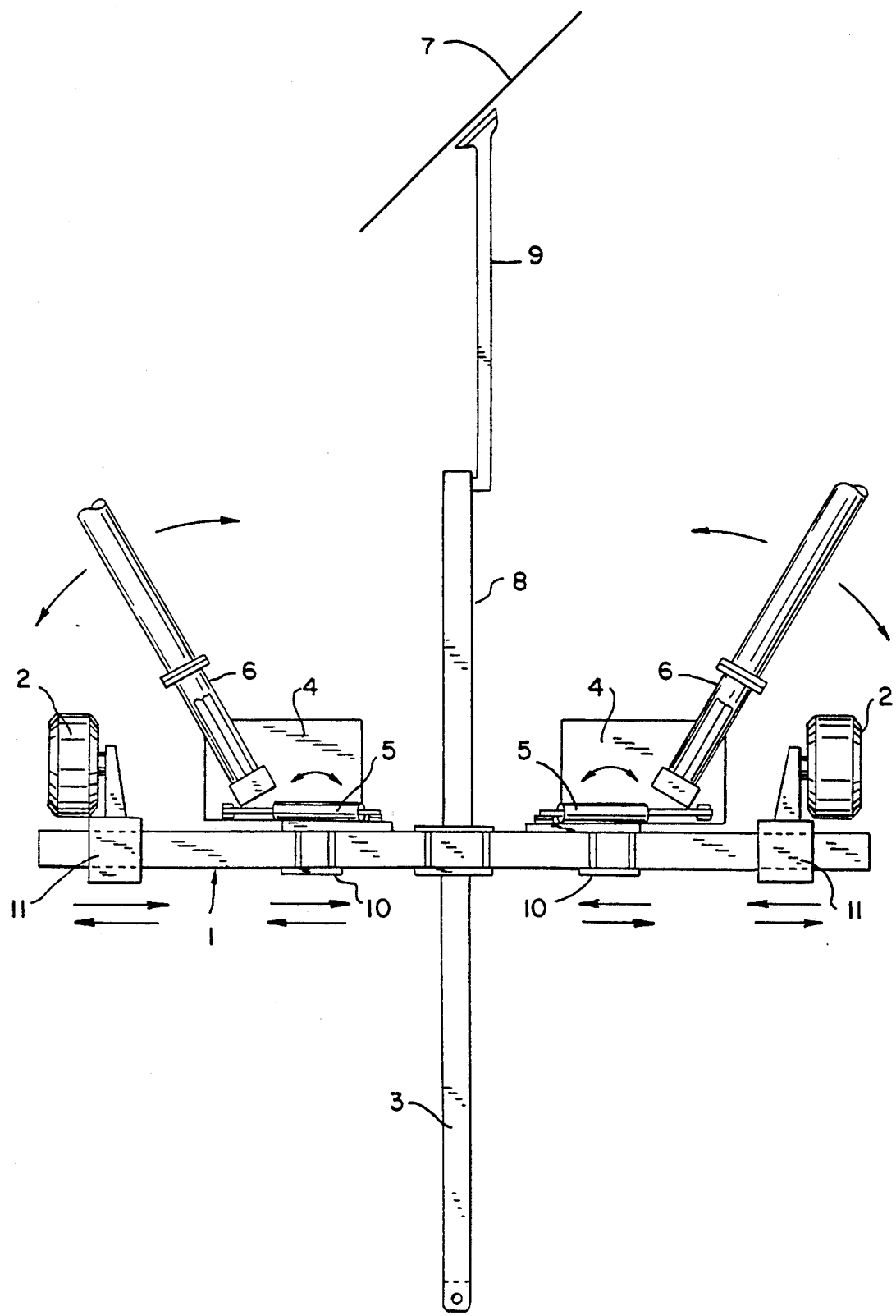

Each support includes a pair of plates located one against the forward surface of the frame (1) and the other against the rearward surface of the frame (1). The plates are connected to each other by a series of bolts which act to clamp the plates onto the frame (1) in a desired position along the length of the frame (1). As shown in FIGS. 11a and 12, the head (4) to which the rake frame (6) is mounted, is pivotably mounted to the forward plate of the support. The cylinder (5) is mounted to the rearward plate, and its rod is connected to the head (4).

In this case (FIG. 12) the central rake wheel is also shown.

The possibility to adjust the width of the moveable heads can also be applied on the first two versions by replacing the support which has been fixed or welded to the frame with moveable supports.

Figure 11B:
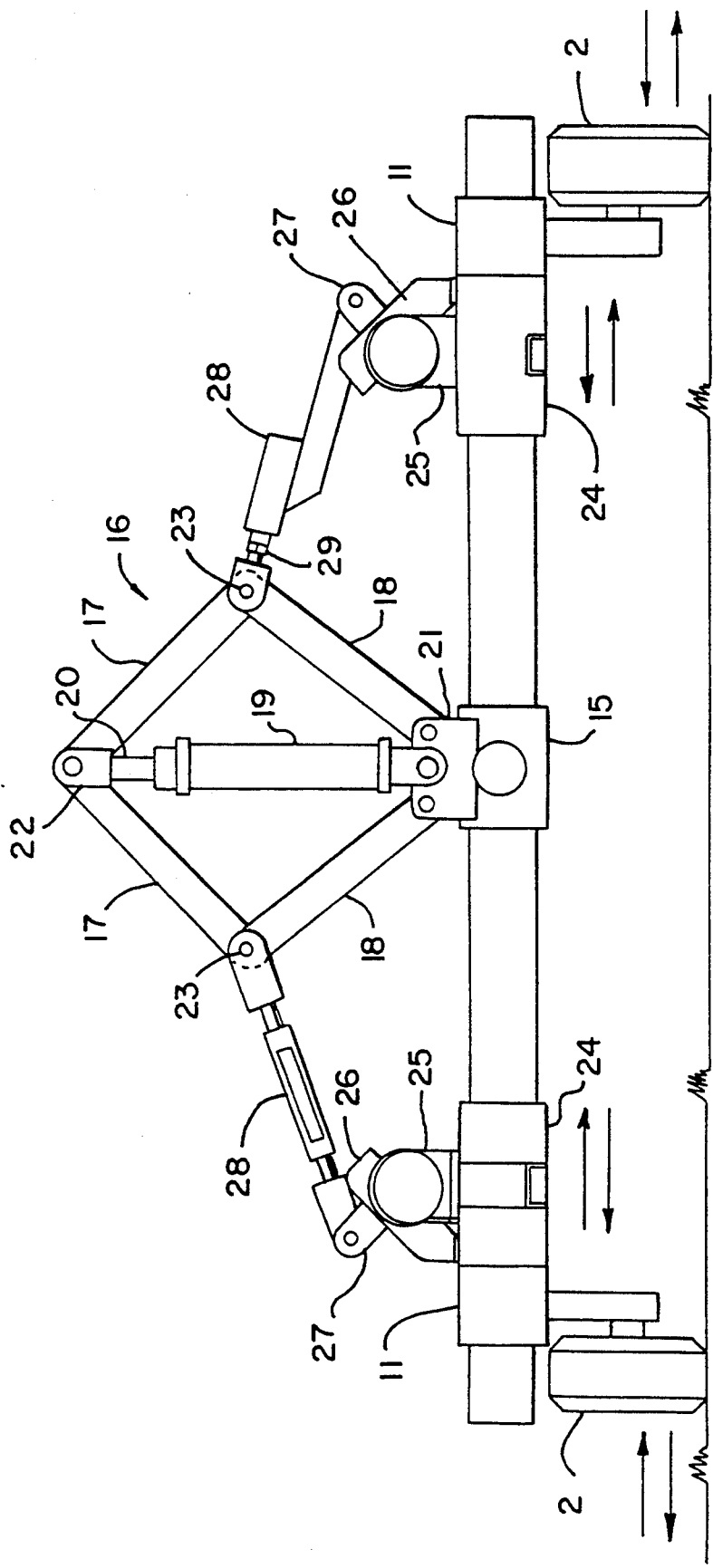
FIG. 11b is a front view of a fourth version of the rake trolley showing a cylinder and linkage arrangement for adjusting the position of the movable heads on the frame.

FIG. 11b illustrates another version of the rake trolley mounted to frame 1, to which pneumatic tires 2 are mounted one on either side of frame 1 through fixed wheel supports 11. In this version, a central bracket assembly 15 is rigidly mounted to frame 1, and a linkage assembly 16 is mounted to bracket 15. Linkage assembly 16 includes upper members 17 and lower members 18, located one on either side of the centerline of frame 1. A hydraulic cylinder 19, having an extendible and retractable rod 20, is mounted between the upper ends of upper linkage members 17 and a plate 21. Plate 21 is mounted to bracket 15, and the lower ends of lower frame members 18 and the lower end of cylinder 19 are mounted to plate 21.

The end of rod 20 is connected to a member 22, to which the upper ends of upper linkage members 17 are pivotably mounted. The lower ends of upper linkage members 17 and the upper ends of lower linkage members 18 are pivotably connected by means of pins 23.

A pair of rake head supports 24 are mounted to frame 1, in a manner similar to that in which the supports are mounted to frame 1 in the version of FIG. 11a. That is, each support 24 (FIG. 11b) includes a plate located on opposite sides of frame 1, with threaded bolts or the like extending between the plates so that supports 24 can be clamped onto frame 1 in a desired location along the length of frame 1.

A block assembly 25 is mounted to each of supports 24, and the end of a rake arm is pivotably mounted to each block assembly 25. A plate 26 is rigidly fixed to each rake arm, and an ear 27 is mounted to each plate 26.

A screw-type link assembly 28 is connected between pins 23 and ears 27, with the ends of link assemblies 28 being pivotable relative to pins 23 and ears 27. Each link assembly includes a screw member 29 for adjusting its length.

The rake trolley version of FIG. 11b is illustrated in its working position, in which rod 20 is retracted into cylinder 19. With linkage 16 in this position, plates 26 are rotated fully downwardly until engagement with supports 24, to place the rake into its working position. When rod 20 is extended to lengthen linkage assembly 16, link assemblies 28 act through ears 27 to pivot plate members 26 and to thereby raise the rake assemblies. With this arrangement, only a single hydraulic cylinder 19 is required to raise and lower the rake assemblies, instead of the two separate cylinders required in the versions of FIGS. 5–11a.

Supports 24 can be moved to varying locations along the length of frame 1, in a manner as explained previously with respect to FIG. 11a. When this is done, link members 28 can be lengthened or shortened by means of screw members 29, to accommodate the varying positions of supports 24 along the length of frame 1.

It is well understood that this trolley is not limited to the examples carried here in. On the basis of this machine one can provide other shapes, other ways of production and the particulars used can be modified without changing the results obtained with this rake trolley.

I claim:

1. A rake trolley, comprising:
   a transverse frame member;
   a pair of rake assemblies each including a rake arm;
   a mounting arrangement for mounting each rake arm to the transverse frame member, with each rake arm being pivotably mounted to the mounting arrangement; and
   a raising and lowering assembly interconnected between the transverse frame member and the rake arms for providing pivoting movement of each rake arm relative to its respective mounting arrangement, the raising and lowering assembly including a linkage mounted to the transverse frame member; a connector member interposed between each rake arm and the linkage; and an extendable and retractable member interconnected with the linkage for moving the linkage between a first position in which the rake arms are in a lowered, working position and a second position in which the rake arms are in a raised, transport position.

2. The rake trolley of claim 1, wherein the extendable and retractable member comprises a hydraulic cylinder having an extendable and retractable rod mounted thereto.

3. The rake trolley of claim 1, wherein the linkage defines an enclosed geometric shape, and wherein the extendable and retractable member is interconnected between opposite corners of the closed, geometric shape defined by the linkage.

4. The rake assembly of claim 3, wherein each connector member is mounted at a first end for pivoting movement relative to the linkage, and at a second end for pivoting movement relative to an ear member mounted through a plate member to the rake arm.

5. The rake trolley of claim 1, wherein each connector member comprises an adjustable length member, and wherein each mounting arrangement is connected to the frame member by means of an adjustable connection assembly movable to varying locations on the frame member for providing adjustability in the position of the rake assembly relative to the frame member, whereby the length of each connector member can be adjusted according to the position of the mounting arrangement on the transverse frame member.

* * * * *